Jan. 30, 1962 M. BUFFOLI 3,018,699
DEVICE FOR THE REALIZATION OF CAMS, ESPECIALLY
FOR CONTROLLING AUTOMATIC TOOLS AND THE LIKE
Filed May 31, 1957 2 Sheets-Sheet 1

INVENTOR
MARIO BUFFOLI
BY
Richards & Geier
ATTORNEYS

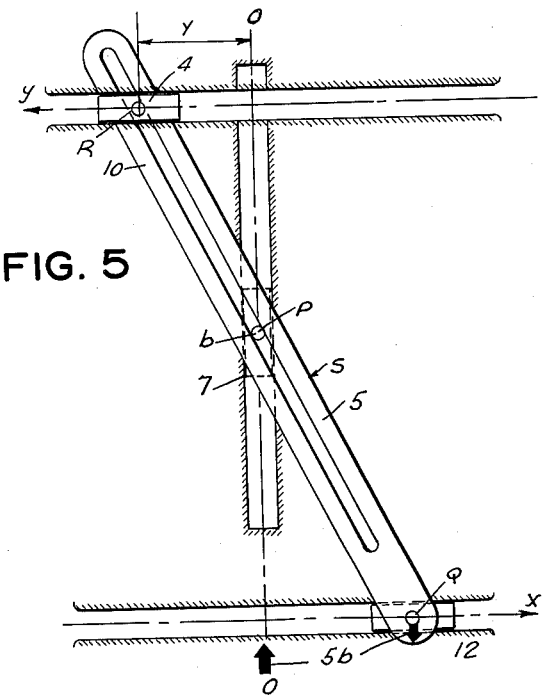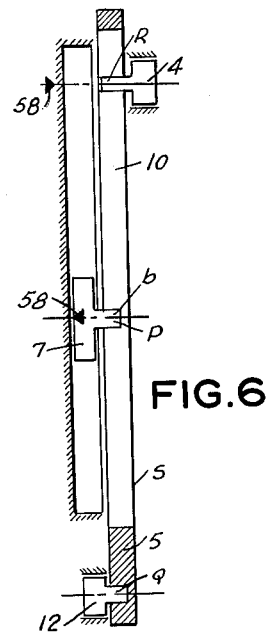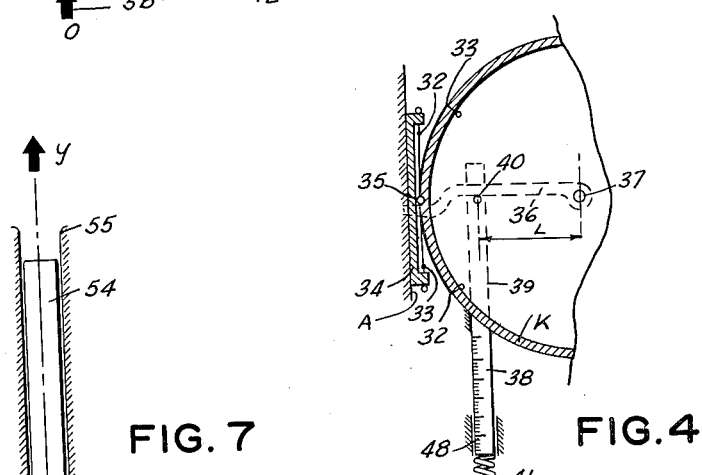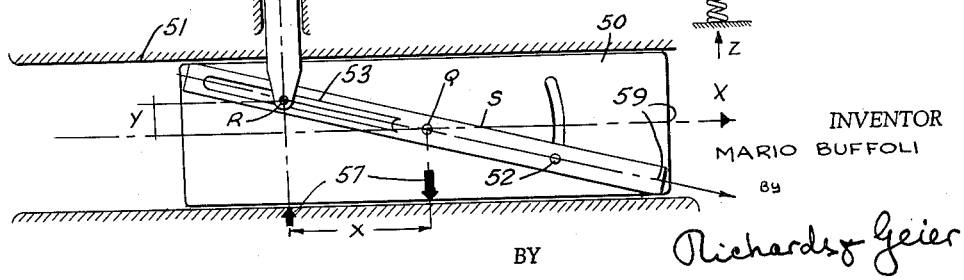

3,018,699
DEVICE FOR THE REALIZATION OF CAMS, ESPECIALLY FOR CONTROLLING AUTOMATIC TOOLS AND THE LIKE
Mario Buffoli, Via Alberto Mario 29, Brescia, Italy
Filed May 31, 1957, Ser. No. 662,931
Claims priority, application Italy June 5, 1956
3 Claims. (Cl. 90—20)

The present invention relates to a device for the manufacture of cams, especially cams for controlling automatic machine tools and the like.

It is known that in order to realize the operative cycle of many automatic machine tools cams have been used moving with a uniform rotary movement.

In general such cams act on a loose roller at the end of an oscillating lever. It is frequently necessary in practice to transmit to the oscillating lever a uniform rotary motion (within a limited angle which is always smaller than 180°); in this case the cam profile is the envelope of a circle (corresponding to the roller) the center of which describes an epicycloidal arc; the base and the rolling line of the relative movement are constituted by two circumferences having their centers on the axis of rotation of the cam and on the axis of oscillation of the lever respectively.

The movement that the cam is to transmit to the lever is generally a cyclic succession of uniform rotary movements having different angular velocities, spaced by accelerated and retarded movements.

The device according to the invention has the object of manufacturing cams of the described species and is substantially characterized by the fact that it comprises a support for the blank of the cam to be produced, which blank rotates around its true operating axis, relatively to the support having a cutting edge shape substantially corresponding to that of the element intended to cooperate with the active cam surface, the two supports (for the cam and the tool) having a relative movement corresponding to the relative movement carried out by the cam and its contacting organ on the operating machine.

The invention will be described with reference to the appended schematic drawing, description and drawing being given only by way of indicative example, not limiting the scope of the invention.

FIG. 4 is a section according to the line IV—IV of FIG. 2 and shows an auxiliary apparatus for controlling the movements of the cam center in respect to the stationary tool;

Figure 1:
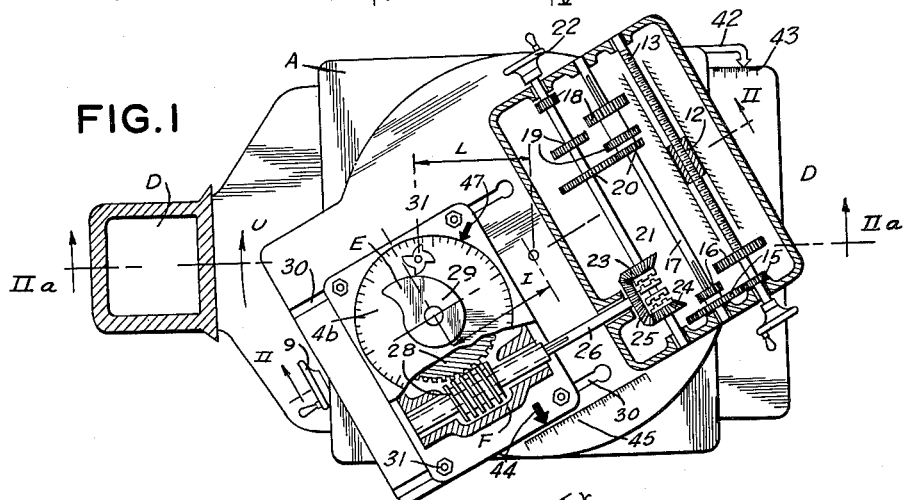
FIG. 1 is a plan view, partially sectioned according to the line I—I of FIG. 2 of a preferred form of realization of the device.

FIG. 5 is a section along the line V—V of FIG. 1;
FIG. 6 is a section along the line VI—VI of FIG. 1;
FIG. 7 is a section similar to FIG. 6 of a different embodiment.

Figure 2:
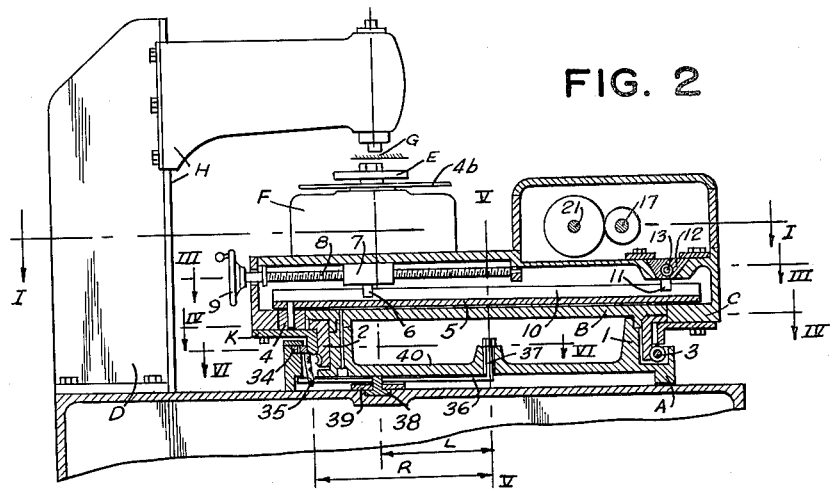
FIG. 2 is a vertical section, along the lines IIa—IIa and II—II of FIG. 1.
Figure 3:
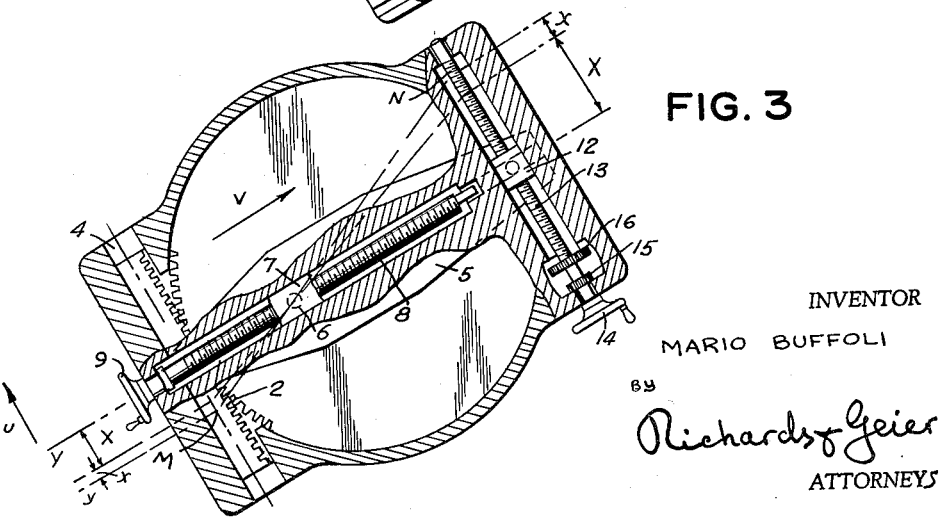
FIG. 3 is partly a section along the line III—III and partly a section along the line IIIa—IIIa of FIG. 2, some parts being removed.

Referring to FIGS. 1, 2 and 3, A indicates the supporting slide of the device, to which is attached the circular plate B around which the body or table C oscillates according to the vertical axis V—V, a trace of which in FIG. 1 is also indicated by V.

The slide A which is movable upon a base D in the direction IIa—IIa is provided with a cylindrical portion 1 with which cooperates the toothed ring 2 meshing on one side with the stationary worm 3 supported by the slide A and on the other side with a rack 4 connected by a pin 60 to the end of an oscillating lever 5 and supported by the table C so as to be able to move along its longitudinal axis. Thus the rack 4 is not fixed to the table C and can swing about the axis of the pin 60 relatively to the lever 5.

The oscillation pivot 6 of the lever is provided by a threaded block 7 cooperating with a screw 8 upon which acts the handwheel 9. The pivot 6 moves in the longitudinal guide 10 of the lever 5. With this same guide 10 cooperates a second pivot 11 carried by a threaded block 12 cooperating with the screw 13 having an axis which is substantially perpendicular to that of the screws 8. Thus the lever 5 can rotate relatively to the table C by the motion of the pins 6 and 11 which slide in the groove 10 of the lever 5.

The screw 13, provided with a handwheel 14 operates, through the one or the other of two pairs of meshing gear wheels 15 and 16, an intermediate shaft 17 which in turn drives, through one of the three pairs of meshing gear wheels 18, 19 and 20, the shaft 21 provided with a handwheel 22.

Upon the shaft 21 are arranged two loose bevel gears 23 and 24, cooperating with the bevel gear 25 keyed on the shaft 26, which is perpendicular to the shaft 21. Either one of the bevel gears 23 and 24 can be connected to the shaft 21 for transmitting motion, by means of the front clutch sleeve 64 which can be axially moved along the shaft 21. The gears 18, 19 and 20 are controlled by the rod or fork 61, while the control rod 62 actuates the gears 15 and 16. 63 is the control lever for toothed couplings 64 controlling the gears 23 and 24.

The shaft 26 drives by means of worm and worm wheel reducing gear 28 the shaft 29 on which the blank is disposed from which the cam E is to be machined.

The shaft 29 provides the true axis of rotation of the cam E.

The shaft 26 is of the telescoping type in order to provide displacements of the reducing gear body F and of the shaft 29 in a direction parallel to that of the shaft 26 in respect to the element C.

To this end guides 30 are provided, with which cooperate the locking bolts of the parts C and F.

The guides 30 further allow substituting the body F of the reducer 28 with another worm reducer not shown on the drawing and having a worm wheel shaft arranged perpendicularly to the axes II and V—V for machining drum axial cams.

The tool intended to produce the cam profile consists in the illustrated example in a milling cutter G carried by a shaft displaceable in the direction of its own axis by means of suitable guides.

The auxiliary apparatus illustrated in FIG. 4 is intended to permit the control of the displacements of the cam carrying shaft 29 relatively to the tool G.

As, in general, the oscillating lever of automatic machines actuated by cams is intended to oscillate a toothed sector, which in turn cooperates with a carriage actuating rack, so it is advisable, in the cam producing device, to be able to control the displacement that the cam will impart to the carriage, which displacement (reduced to the ratio between the radius of the toothed sector and the length of the oscillating arm) is represented by the development of the arc produced by the center of the loose roller carried by the oscillating arm, the roller upon which, as above stated, the cam operates.

The control apparatus is constituted by an annular or discoidal member K on the periphery of which rest two bands, wires or the like 32 and 33 which are flexible and inextensible, each of said wires being anchored at one end to the member K and at the other end to a carriage 34 which is able to slide tangentially to the annular member K and is driven in either direction by the latter's rotation through the flexible bands, wires or the like 32 and 33.

The carriage 34 is integral with a pin 35 acting upon an oscillating lever 36 the fulcrum of which 37 is located on the axis V—V.

The annular member K is rigidly connected to the member C and its center coincides with the axis of rotation V—V of the element C relatively to the base A, while the carriage 34 is guided perpendicularly to the slide guide A by the base A itself.

The apparatus is completed by a slide 38 able to move in a direction parallel to that of the carriage 34, and held by the guides 39 connected to the base D of the machine. The slide or scale 38 determines the distance between the point 29 and the vertical axis of the cutter G.

The slide 38 has a pin 40 resting against the lever 36 at a point between the pin 35 and the oscillation fulcrum 37 of the lever 36. A spring 41 urges the slide 38 in an axial direction as shown by the arrow Z in such manner that the pin 40 acts upon the lever 36 and the latter acts upon the pin 35 of the carriage 34.

The operation of the device is as follows:

The supporting slide A is shifted from left to right (looking in the direction of FIGURE 1) until the vertical axis V—V is located at the distance L from the central vertical axis of the cutting tool G. The distance L corresponds to the length of the oscillating roller carrier arm of the operating machine, i.e., the distance between the axis of the cam resting roller and the axis of oscillation of the lever. The correct position of the slide A can be easily determined by means of an indicator 42 which is carried by the slide A and which moves over a scale 43 provided upon the base D of the machine.

Then the reducing gear body F is shifted in the guides 30 relatively to the body or table C until the axis of rotation of the shaft 29 carrying the cam E is moved to the distance I from the vertical axis V—V. The distance I corresponds to the distance in the operating machine between the axis of rotation of the cam and the oscillation axis of the roller carrier arm. The correct position of the gear body F can be easily determined by means of an indicator 44 which is carried by the gear body F and which moves over a scale 45 provided upon the table C.

Making allowance for the working diameter of the cam and the diameter of the tool (the latter corresponding substantially to the diameter of the roller of the machine tool or being slightly larger than such diameter) it is now possible to rotate the table C until relative positions of the cam E and the tool G are attained which correspond to the relative positions of the cam and its contact roller. These positions are the positions of maximum distance between the axes of the roller and the cam for the portion of the cam having its greatest radius. The rotation of the table C is accomplished by the worm pinion 3. At that time the hand wheel 22 is actuated to free the shaft 29 from connection with the threaded shaft 13, the pairs of gears 18, 19 and 20 being out of mesh. The pinion 3 will rotate the table C through the rack 4 having the pin 60 and stationary but adjustable pivots 6 and 11 both on table C. The motions of pin 60 as well as adjustable pivots 6 and 11 communicate their actions by a common groove 10 in the member 5.

By rotating the hand wheel 14 the slide 12 with the pin 11 is moved to its middle position, so that the axis of the pin 11 rests on the line II—II. Then some of the pairs of gears 18, 19 and 20 and some of the members 16 are brought into mesh to provide the required transmission ratio. By rotating the hand wheel 9 the slide 7 and the pin 6 are moved to a position in which the axis of the pin 6 coincides with the axis of the pin 60 which is the axis of oscillation of the rack 4 relatively to the lever 5. In this position it is possible to move transversely the pin 11. The coupling sleeve is then moved axially to connect the shaft 21 with either the bevel gear 23 or the bevel gear 24, depending as to whether the spiral of the cam is to be a right hand one or a left hand one.

Now by actuating again the hand wheel 14, the cam E is caused to rotate through the work angle and simultaneously the pin 11 of the slide 12 moves to the position N in FIGURE 3. The arm 5 oscillates about the common axis of the pins 6 and 60; therefore, the rack does not move and the table C does not rotate.

However, the rotation of the screw 13 has provided the rotation of the cam E from the point of maximum radius to the starting point of the ascending portion of the cam. This angle of rotation is indicated upon a circular scale 46 fixed to the cam carrier shaft 29 by means of an indicator 47 carried by the reducer head.

Now, by turning the hand wheel 9, the pin 6 and the slide 7 are moved along the guides 10 of the arm 5 in the direction of the arrow $v$. When the pins 60, 6 and 11 are set in a line along the lever 5 the table C will be rotated in the direction of the arrow U. It is apparent that the rotation of the table C relatively to the wheel 2 can take place when the wheel 2, the rack 4 and the table C are in the position shown in FIGURE 3. In this position, rack 4 rolls on wheel 2 and runs on the longitudinal guide with which table C is provided.

While table C rotates with respect to wheel 2, the contact point between rack 4 and wheel 2 moves also, namely, this point moves both on wheel 2 and rack 4. Thus it is clear that rack 4 does not prevent relative rotation of members 2 and C in such position. During this movement the pin 60 connected to the rack will move jointly therewith, following a predetermined path. Thus the movement which takes place in the device shown in FIGURE 3 is caused by lever 5; lever 5 is connected at one end (11) to table C, the other end being connected to rack 4. By moving pin 6 in groove 10 of lever 5, rotation of members 2 and C is produced due to the necessity that the pins 11, 6 and 60 be aligned along a straight line at all times; therefore, to achieve this condition, it is necessary that rack 4 rolls on wheel 2, thereby moving pin 6 away from its original position. It is thus apparent that while the cam E does not rotate, the rack 4 rolls off the stationary toothed ring 2, sliding in its supporting guides on the table C. Thus the tool G penetrates into the cam blank (which is stationary) for forming the section of the cam of minimum radius.

The turning of the hand wheel 9 can be controlled by the scale 48 carried by the slide 38 of the auxiliary device (FIG. 4) and an indicator 49 upon the base D.

The slide 7 is moved in the direction of the arrow $v$ until the scale 48 shows the extent of travel which the carriage of the machine tool to be produced must carry out during the rotation of the cam portion in question. The angle of rotation of the table C corresponds substantially to the angle of oscillation of the roller carrier arm of the machine tool during its contact with the cam portion being produced.

At the end of the movement of the slide 7 in the direction of the arrow $v$, the oscillation center of the rack 4 has passed the point M and the longitudinal axis of the lever 5 is now determined by the points N, 6, M.

The hand wheel 14 is then turned in the opposite direction to return the pin 11 to its middle position. Then the cam E is again rotated through its working angle, namely, from the point having the minimum radius to the point having the maximum radius. At the same time the pin 60 of the rack 4 is returned to its middle position, rotating the table C in a direction opposite to that of the arrow U, whereby the cam is cut along the desired work arc.

It is apparent that the table C can be rotated by the movement of the pin 6, since the rack 4 is connected to the table C by the pin 60, while the arm 5 is free and is connected to the table C only through the pins 11 and 6. The pin 60 cooperates with the end of the arm 5. The pins 6 and 11 provide the rotation of the arm 5 relatively to the stationary gear 2, while the rack 4 which is actuated by the arm 5, rolls over the gear 2 and determines the extent of the rotation through the pin 60.

During the manipulation of the handwheel 14, therefore, the desired portion of the cam profile is produced (increasing radius profile). A constant ratio is, in fact, realized between the rotational speed of the body C around the axis V—V and the rotational speed of the cam C, and, therefore, the relative movement between roller and cam of the machine tool to be equipped is exactly produced, in that the triangle formed, by the axis of the pivot 6, by the point M and the axis of the rack 4 pin, and the triangle formed by the axis of pivot 6, by the point N and the axis of the pivot 11, are similar. The displacements indicated by X and Y in FIG. 3 are, therefore, proportional for any value of the lengths X and Y.

The operation of the device illustrated in FIG. 4 is easily understood when one considers that the displacement of the pivot 15 relatively to the displacement of the pivot 40 depends on the ratio of the respective distances from the axis 17, in that the pivots are kinematically connected by the lever 36 fulcrumed at 37.

The distance R remains constant, while the distance L automatically attains the due value (corresponding to the value L of FIG. 1, which value is read on the scale 48) when, as before described, the body A is displaced on the base D until the distance L is reached. The displacement of the pivot 35 during the rotation of the body C is the development of the arc of the body C during the generation, and therefore the displacement of the pivot 40 and, in consequence, of the scale 48 relatively to the index 49 corresponds to the effective oscillation arc of the roller axis around the axis of the arm on the machine tool, and definitively corresponds to the value of the displacement of the carriage if the latter is rack driven by a toothed sector having a pitch circle equal to L.

When it is desired to machine pushrod type cams (i.e. cams with which cooperates a pushrod and not a roller) the curve of the cam 6 is constituted by the envelope of the shape of the push rod; then in place of the milling cutter G is provided a tool cutting by rectilinear reciprocating motion, having the shape of the push rod.

I claim:

1. An apparatus for machining cams, comprising a base, a supporting slide movably mounted upon said base, a circular plate carried by said slide, a table mounted upon said plate and rotatable relatively thereto, a worm carried by said slide, a rack supported by said table and movable along its longitudinal axis, an oscillating lever having a longitudinal guide, said rack being connected to an end of said oscillating lever, a toothed ring meshing with said worm and said rack, a threaded block, a pin carried by said block and engaging said guide, a screw carrying said block, another threaded block, another pin carried by the second-mentioned block and engaging said guide, another screw carrying the second-mentioned block and extending substantially perpendicularly to the first-mentioned screw, an intermediate shaft, a second shaft, variable transmission means connecting the second-mentioned screw with said intermediate shaft and connecting said intermediate shaft with said second shaft, a telescoping shaft, variable bevel gear means connecting said second shaft with said telescoping shaft, a worm reducing gear driven by said telescoping shaft, a cam blank-carrying shaft driven by said worm reducing gear, means supporting said worm reducing gear for movement in the direction of said telescoping shaft, a cutter-carrying shaft, and means supporting said cutter-carrying shaft upon said base.

2. An apparatus for machining cams, comprising a base, a supporting slide movably mounted upon said base, a circular plate carried by said slide, a table mounted upon said plate and rotatable relatively thereto, a worm carried by said slide, a rack supported by said table and movable along its longitudinal axis, an oscillating lever having a longitudinal guide, said rack being connected to an end of said oscillating lever, a toothed ring meshing with said worm and said rack, a threaded block, a pin carried by said block and engaging said guide, a screw carrying said block, a hand wheel connected with said screw for actuating the same, another threaded block, another pin carried by the second-mentioned block and engaging said guide, another screw carrying the second-mentioned block and extending substantially perpendicularly to the first-mentioned screw, another hand wheel connected with the second-mentioned screw for actuating the same, an intermediate shaft, a plurality of pairs of selectively meshing gear wheels carried by said intermediate shaft and the second-mentioned screw, a second shaft, a plurality of pairs of selectively meshing gear wheels carried by said intermediate shaft and said second shaft, a third hand wheel carried by said second shaft, two bevel gears upon said second shaft, a front clutch sleeve for selectively connecting any one of said two bevel gears with said second shaft, a telescoping shaft extending substantially perpendicularly to said second shaft, a third bevel gear keyed to said telescoping shaft and meshing with said two bevel gears, a worm reducing gear driven by said telescoping shaft, a cam blank-carrying shaft driven by said worm reducing gear, means supporting said worm reducing gear for movement in the direction of said telescoping shaft, a cutter-carrying shaft, and means supporting said cutter-carrying shaft upon said base.

3. An apparatus in accordance with claim 2, comprising an auxiliary apparatus for controlling the displacements of said cam blank-carrying shaft relatively to said cutter-carrying shaft, said auxiliary apparatus comprising an annular member connected to said table, a movable carriage tangent to said annular member, two wires, each of said wires having an end fixed to said annular member and another end fixed to said carriage, a pin carried by said carriage, an oscillating lever engaged by said pin, a slide, a pin carried by said slide and engaging said lever, guides supporting said slide for movement parallel to said carriage, and a spring engaging said slide.

References Cited in the file of this patent

UNITED STATES PATENTS

| | | |
|---|---|---|
| 1,542,582 | Raiche | June 16, 1925 |
| 1,689,370 | Tessky | Oct. 30, 1928 |
| 2,366,993 | Antos | Jan. 9, 1945 |